United States Patent
Li et al.

(10) Patent No.: US 6,381,252 B1
(45) Date of Patent: Apr. 30, 2002

(54) METHOD AND SYSTEM FOR MANAGING COMMUNICATION RESOURCES

(75) Inventors: Kwok-Leung Li, Silver Spring; Shiuan-Haur Lu, North Potomac; Chih-Lung Sung, Bethesda; Sy-Ling Yen, Rockville; Yuan-Shiang Chang, Laurel, all of MD (US)

(73) Assignee: Armilliare Technologies, Inc., Bethesda, MD (US)

(*) Notice: Subject to any disclaimer, the term of this patent is extended or adjusted under 35 U.S.C. 154(b) by 0 days.

(21) Appl. No.: 09/641,926

(22) Filed: Aug. 17, 2000

Related U.S. Application Data

(60) Provisional application No. 60/149,473, filed on Aug. 19, 1999.

(51) Int. Cl.[7] .................... H04L 12/28; H04L 12/56; H04J 3/16; H04J 3/22; G06F 15/173
(52) U.S. Cl. ............ 370/483; 370/395; 370/401; 370/465; 709/223; 709/227
(58) Field of Search .................. 370/438, 401, 370/410, 524, 465, 463, 395, 229, 230, 286; 709/223, 227, 229

(56) References Cited

U.S. PATENT DOCUMENTS

| | | | |
|---|---|---|---|
| 5,778,320 A | * 7/1998 | Drozt et al. | 455/509 |
| 5,867,667 A | * 2/1999 | Butman et al. | 395/200.79 |
| 5,894,556 A | 4/1999 | Grimm et al. | 395/200.57 |
| 5,901,205 A | 5/1999 | Smith et al. | 379/93.01 |
| 5,951,644 A | * 9/1999 | Creemer | 709/229 |
| 6,002,671 A | 12/1999 | Kahkoska et al. | 370/248 |
| 6,148,410 A | * 11/2000 | Baskey et al. | 714/4 |
| 6,208,657 B1 | * 3/2001 | Dendi et al. | 370/401 |
| 6,226,376 B1 | * 5/2001 | Horan | 379/242 |
| 6,266,342 B1 | * 7/2001 | Stacey et al. | 370/465 |

FOREIGN PATENT DOCUMENTS

WO    WO 99/35803    7/1999

OTHER PUBLICATIONS

Hunt, G.H. et al., "Network Dispatcher: a connection router for scalable Internet services" Computer Networks and ISDN Systems, NL North Holland Publishing. Amsterdam, vol. 30, No. 1–7, Apr. 1, 1998, pp. 347–357, XPO04121412 ISSN: 0169–7552, the whole document.

Damani, O.P. et al., "ONE–IP: techniques for hosting a service on a cluster of machines" Computer Networks and ISDN Systems, NL North Holland Publishing. Amsterdam, vol. 29, No. 8–13, Sep. 1, 1997, pp. 1019–1027, XP004095300, ISSN: 0169–7552, the whole document.

* cited by examiner

*Primary Examiner*—Wellington Chin
*Assistant Examiner*—M. Phan
(74) *Attorney, Agent, or Firm*—Hunton & Williams

(57) ABSTRACT

A method and system for managing and allocating multiple communication resources to ensure relatively equal usage. The selection of the resource can be performed by retrieving a pointer value, and testing the resource associated with the pointer value monitoring the call duration over this resource and appropriately updating it's status (if the call duration is below the threshold, a bad call count for the channel is incremented. And when the bad call count exceeds the threshold the channel is marked as faulty). The pointer value as necessary to find a usable resource, and a usable resource is selected. The pointer value can be modified either before the testing of the initially-selected resource, or after the final selection of the usable resource.

20 Claims, 3 Drawing Sheets

FIG. 3

| | CHANNEL NUMBERS | | | | | | | | | | | | | | | | | | | | | | |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| TRUNK 1 | B | B | B | B | B | B | B | B | I | I | I | B | I | I | I | O | O | I | I | I | I | I | D |
| TRUNK 2 | B | B | B | B | I | I | I | B | B | B | B | B | O | O | O | O | I | I | I | I | I | I | I |

B = BUSY
(WITH TRAFFIC ON THE CIRCUIT)

I = IDLE
(AVAILABLE FOR USAGE)

O = OUT OF SERVICE
(DEFECTIVE OR NOT PROVISIONED)

METHOD AND SYSTEM FOR MANAGING COMMUNICATION RESOURCES

This application claims priority from provisional application N0. 60/149,473 filed Aug. 19, 1999.

BACKGROUND OF THE INVENTION

The present invention generally relates to the management of communication resources. More particularly, the present invention relates to a method and system for assigning one of a number of communication channels to service a call request.

In a communications network, often there are a number of communication resources (e.g., modems, channels, etc.) available to service a call request. For example, a common way to connect to the Internet is to initiate a connection request from an Internet-compatible device, and to communicate through a local exchange carrier to an Internet service provider which may have a large number of modems to service the call request and provide Internet access to the requesting device.

The call request travels from the requesting device through a public switched telephone network (PSTN) to a local exchange carrier (e.g., a switch), and finally to a remote access server (RAS). The switching systems owned by the local exchange carriers typically terminate calls to the RAS in sequential order, usually starting with the same modem each time a call is placed to the RAS and searching, in order, for the next available modem. This method of assigning modems or communication channels is undesirable because modem usage is higher for some modems (e.g., those closer to the "first" modem) than for other modems. This excessive usage of particular modems can increase the failure rate and/or maintenance needs of such modems. Further, the repeated use of a modem more prone to failure can adversely affect call completion statistics. It is also desirable to detect faulty modems and refrain from using them as long as the good modems are available.

The available re sources between a local exchange switch and an ISP modem pool can be defined as trunks and channels. In North America, a common standard trunk contains 24 channels, one or more of which are dedicated for signaling (e.g., exchange control signals to set up a call), and the remainder of the channels are usable as bearing channels that can carry modem calls. The local exchange carrier typically maintains a list of all available resources that lead to a particular ISP. When a user dials that particular ISP, the switch searches through the channel list and selects the first available channel to service the call request.

U.S. Pat. No. 5,901.205 discloses an adaptive voice and data bandwidth management system for multiple line digital subscriber loop data communications. The system is implemented in a subscriber loop to permit higher data rates and adaptive allocation of this increased capacity between multiple applications. The management system communicates digital data across multiple-lines when these lines are not in use by other communication equipment. However, when a request for use of a line by another device is detected, a modem clears down a subscriber line and connects the subscriber line to the appropriate communication device. As a result, simultaneous use of a modem and other communication devices is allowed. Once the other communication device ends its communication session, the system adapts to once again communicate digital data over multiple lines in order to increase the speed and efficiency of the data communication.

U.S. Pat. No. 6,002,671 discloses a method of testing ADSL (asymmetric digital subscriber line) circuits. A test instrument is connected to the customer premises end of the ADSL circuit, consisting of an ATU-C modem on the central office end and an ATU-R modem on the customer premises end, with a twisted-pair telephone line connecting the ATU-R and ATU-C modems. A remote test instrument is coupled to the ATU-C modem, typically on a semi-permanent basis in the central office, dedicated for testing multiple ADSL circuits by communicating with multiple ATU-C modems via a switch or router. The test instrument and remote test instrument communicate with each other in full duplex via the ADSL circuit using Internet Protocol (IP) data packets. The test instrument generates the upstream data traffic, controls the test sequence, and controls and coordinates the throughput test with the remote test instrument. The remote test instrument sends the downstream data traffic and returns the results of the throughput test in the form of frame counts from its end of the ADSL circuit back to the test instrument at end of the test sequence. The results from the upstream and downstream throughput tests are then visually displayed to the user of the test instrument.

U.S. Pat. No. 5,894,556 discloses a network match making method and system which matches an additional computer executing an instance of a client computer program with one or more other computers executing instances of client computer programs. The computers are linked by one or more communication links. A match maker computer program receives a request from the instance executing on the additional computer to match with an instance executing on another computer. A measurement request is sent to the instance executing on the additional computer. Communication attributes between the additional computer and each existing computer are measured and an existing computer is selected as a match for the additional computer if one of the communication attributes exceeds a minimum performance requirement. Existing computers can be further selected based on further attributes. If none of the communication attributes meets the minimum performance requirement, a match maker program waits for a further request. The communication attributes measured can relate to at least one parameter such as latency, packet lost rate, and bandwidth.

SUMMARY OF THE INVENTION

It would be desirable to provide a method and system for managing and allocating communication resources which provides for relatively equal utilization of the communication resources, and which avoids potential resource malfunction due to overuse. It would also be desirable for such a method and system to enable the achievement of improved call completion statistics. It would further be desirable for such a method or system to work effectively using only information available from the network; that is, without requiring fault data from a destination communication terminal or device.

The characteristics above would be highly desirable in a method or system for allocating modem usage for a pool of available modems.

The present invention overcomes the problems and achieves the desirable goals noted above by providing a method and system for managing and allocating communication resources such that calls are equally distributed among available resources. According to exemplary embodiments described below, the method or system allocates a channel or resource to the incoming call. The channel allocated is such that it is the next available good channel to the channel allocated for the previous call on this trunk. Every channel allocated to a call is monitored for the call duration. If the call duration is less than the bad call threshold, the bad call counter attached to it is incremented. When a bad call counter is a multiple of bad call threshold, a notification is sent to the administration in the form of an alarm.

The selection of the trunk or signaling channel and the bearing channel can be performed by retrieving a pointer value, testing the trunk or channel associated with the pointer value, modifying the pointer value as necessary to find a usable trunk or channel, and selecting the usable trunk or channel. The pointer value can be modified either before the testing of the trunk or channel, or after the final selection of the usable trunk or channel.

The present invention advantageously provides for a relatively equal usage of multiple communication resources, and is particularly advantageous for using modems in a modem pool.

BRIEF DESCRIPTION OF THE DRAWINGS

The advantages of the present invention will be understood more fully upon reading the following Detailed Description of presently preferred embodiments of the invention in conjunction with the accompanying drawings, in which:

FIG. 3 is a diagram representing an exemplary trunk/channel arrangement which can benefit from a method according to the present invention.

DETAILED DESCRIPTION

Figure 1:
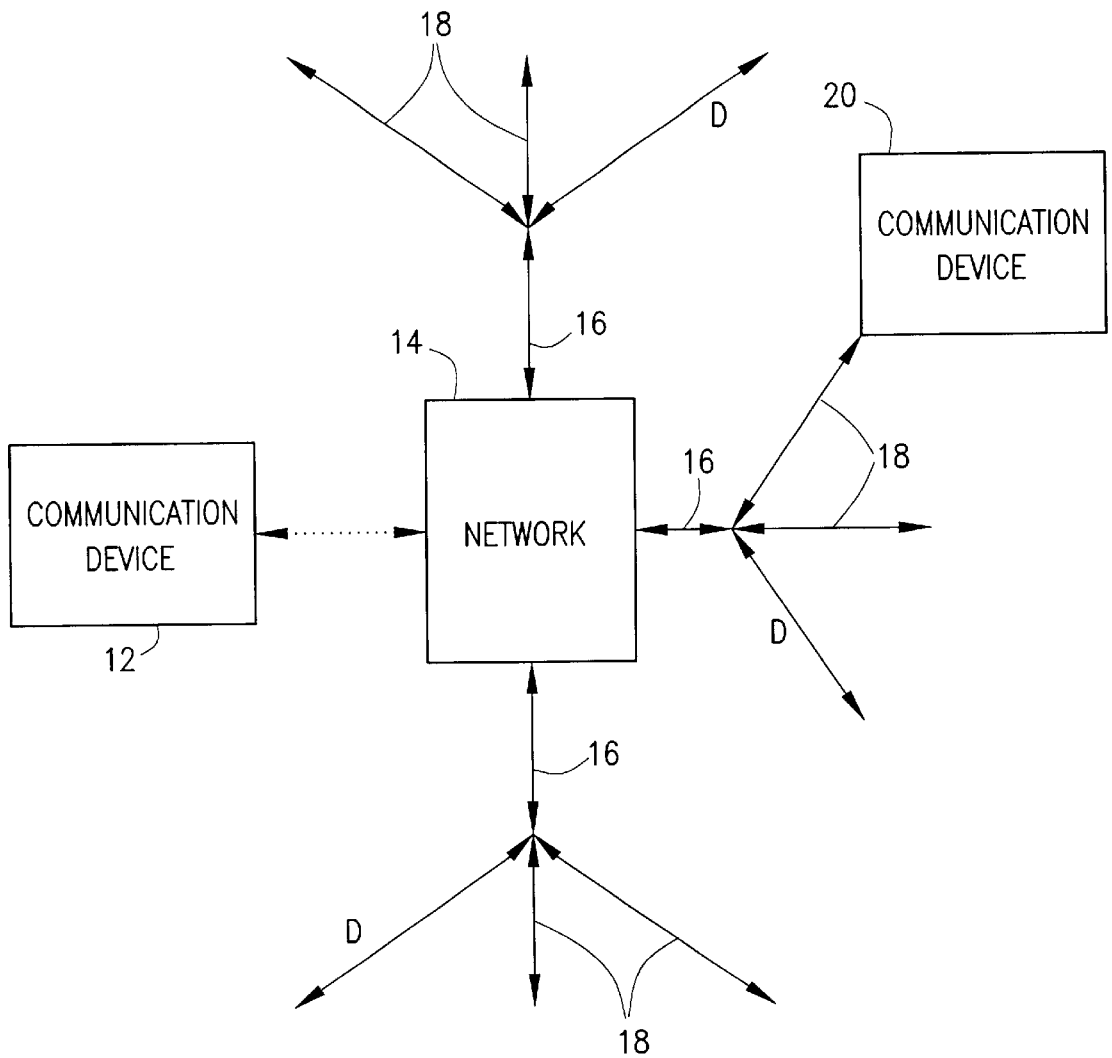
FIG. 1 is a diagram of a communication system in which embodiments of the present invention can be advantageously implemented.

Referring now to FIG. 1, an exemplary communications system 10 is shown, in which an individual communication device 12 associated with one or more users is connected to a communications network 14 which includes a plurality of trunks 16. Each trunk 16 has at least one signaling channel D for controlling a call set up procedure. Each trunk 16 further includes a plurality of bearing channels 18, each bearing channel capable of supporting a communications link which includes the device 12, the network 14, and a destination terminal 20. The destination terminal 20 can be one of a plurality of modems associated with an Internet Service provider, but can alternatively be any suitable communications device or equipment. The system of FIG. 1 is suitable for implementing the concepts of the present invention.

Figure 2:
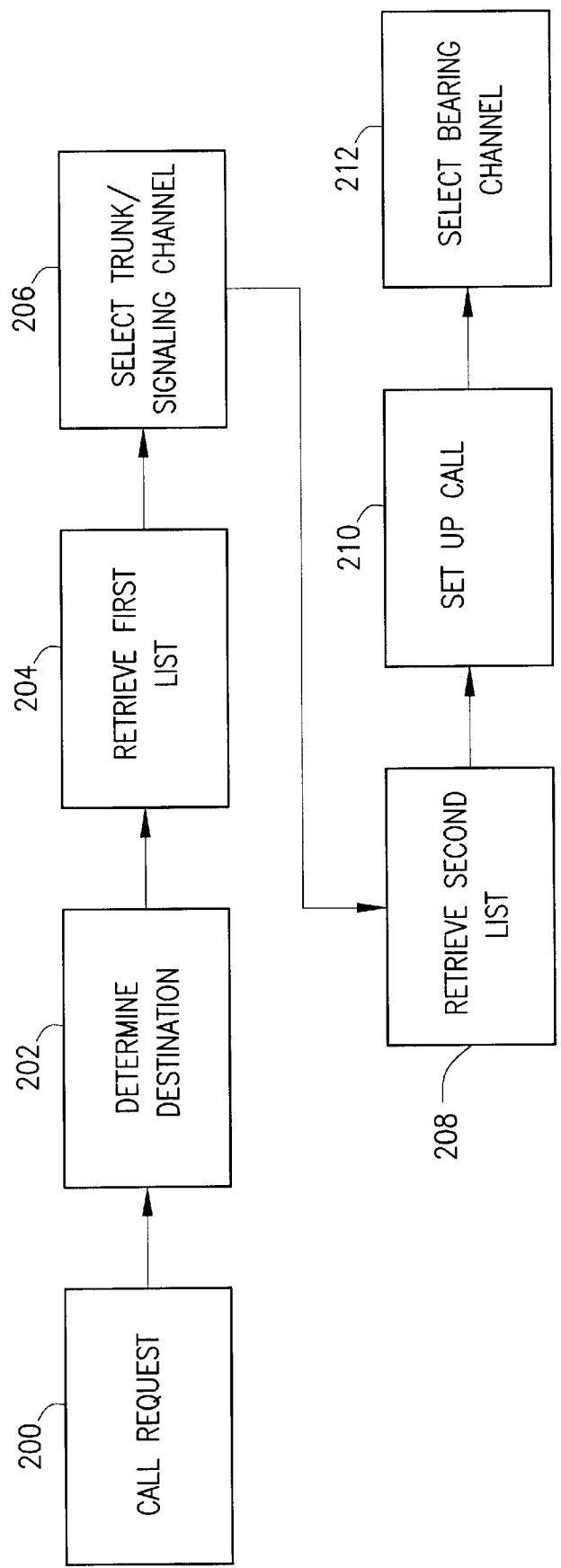
FIG. 2 is a flow chart describing an exemplary method of the present invention.

Referring now to FIG. 2, a flow chart describing a met hod according to an embodiment of the present invention is shown. Such a method can be implemented in software, stored as machine-readable instructions on a storage medium associated with a processor in a communications network switch. The method begins in step 200, where a call request is initiated (e.g., by a remote communication device) and received by the communication network. In step 202, the processor determines from the call set up request the identity of the outgoing interface. In step 204, the processor retrieves a first list of network communication resources identifying one or more signaling channels or trunks. Each signaling channel controls one or more bearing channels (associated with the same corresponding trunk) leading to the corresponding desired route. Thus, where multiple trunks have bearing channels which service the desired route, the first list will identify all such trunks (or all such signaling channels associated with such trunks). In step 206, a signaling channel (and thus a trunk) is selected in a manner to be described below. In step 208, the processor retrieves a second list, which is a list of bearing channels controlled by the selected signaling channel (or contained within the selected trunk). In step 210, one of the bearing channels is selected for use to complete the requested call. In step 212, the requested call is set up using the selected signaling channel and bearing channel. The method of FIG. 2 is one embodiment of the present invention which can advantageously be used to manage a plurality of network communication resources for connecting to a plurality of service providers.

Exemplary methods used in steps 206 and 210 will now be described. According to one embodiment of the invention, the signaling channel or trunk can be selected in step 206 from the first list by retrieving a pointer value which corresponds to one of the signaling channels or trunks on the list, modifying (such as by incrementing, decrementing, or randomly adjusting using a pseudo-random number generator or other suitable device or program associated with the processor) the pointer value, and selecting the signaling channel or trunk which corresponds to the modified pointer value. If the pointer value exceeds the number of trunks or signaling channels on the list, the pointer value is reset. It will be appreciated that the pointer value can be modified after the selection of the signaling channel or trunk rather than before the selection occurs.

The bearing channel can be selected from the second list in step 210 by retrieving a second pointer value which corresponds to a particular one of the bearing channels on the second list, modifying (such as by incrementing, decrementing, or randomly adjusting) the second pointer value, and initially selecting the bearing channel which corresponds to the modified pointer value. It should be appreciated that this step, or other appropriate steps, can include a modem fault detection function such as is disclosed in applicant's copending assigned application entitled "Modem Fault Detection", the entirety of which is hereby incorporated by reference. The initially selected bearing channel can be examined to determine whether it has a positive status (e.g., is operable and idle) or a negative status (e.g., is busy or out of service). If the initially selected bearing channel has a positive status, it is allocated for the incoming call. If the initially selected bearing channel has a negative status, the second pointer can be adjusted again or successive bearing channels can be examined to find a bearing channel which has a positive status. As with the selection of the signaling channel or trunk, the value of the second pointer can be modified after the selection of the bearing channel rather than before the selection.

Referring now to FIG. 3, a channel diagram of a communication system in which the present invention can be implemented is shown. In this system, there are two trunks 31 and 32. Each trunk has communication bearing channels 1–23, and a signaling channel D. Each channel is designated as having one of three status levels: B designates "busy", which means that the channel is currently in use; I designates "idle", which means that the channel is available for use; and O designates "out of service", meaning that the channel is defective or otherwise not usable for carrying signal traffic to service a call request. It will be appreciated that status levels in the diagram of FIG. 3 are instantaneous values at a precise moment in time, as the status of each channel changes as "idle" channels are assigned and become "busy", "busy" channels become available and thus "idle", "out of service" channels become operable, etc.

In the example of FIG. 3, it will now be assumed that the first pointer (that is, the trunk or signaling channel pointer) has a current value of 2, corresponding to the second trunk 32 and/or its associated signaling channel. If a call request is received at this time by the relevant processing circuitry in the network, the first pointer is retrieved and modified (in this example, incremented by 1) to render the value of the first pointer as 3. Since 3 exceeds the number of trunks in the system, the value of the first pointer is reset to 1, which corresponds to the first trunk 31.

A second pointer is retrieved, this second pointer having a value corresponding to one of the channels 1–23 on the selected trunk. In the present example, it is assumed that the second pointer has a value of 12, corresponding to channel 12 of the first trunk 31. The second pointer is retrieved and modified (in this example, incremented by 1), resulting in an initial selection of channel 13. A determination of the status of channel 13 indicates that the channel is idle (that is, has a positive status), and channel 13 is selected to complete the call request.

For a subsequent call request, continuing with the example of FIG. 3, the first pointer would be retrieved (having a current value of 1) and modified (incremented) to have a value of 2, corresponding to the signaling channel of the second trunk 32. Next, a second pointer for this trunk or signaling channel is retrieved (which may or may not be the same second pointer as for the first trunk, as described above), and in this example is assumed to have a value of 11. This value is modified (here, incremented by 1) to generate a value of 12 to be used for an initial selection. As shown in FIG. 3, a determination of the status of channel 12 in second trunk 32 reveals that this channel is out of service. Thus, the second pointer for the second trunk 32 is modified again (here, incremented by 1) to generate a new value of 13 to be used for an initial selection. Since channel 13 is also revealed to be out of service, the process continues until channel 15 is initially selected, examined to verify its idle status, and then finally selected as the channel to be used to service the pending call request.

If all of the channels in a trunk have a negative status (e.g., are busy, out of service, etc.), then the first pointer will be modified to examine another trunk. If all channels on all of the trunks are found to have a negative status, a message such as "request fail" will be returned by the network processor to the requesting device 12. If the negative status is faulty modem, then the processor can attempt to allocate the call on the faulty modem trunk having a lowest bad call count.

While the foregoing description includes many details, it is to be understood that these are provided by way of example only, and are not to be construed as limitations of the present invention. The examples disclosed above can be modified in many ways without departing from the scope of the invention, as is intended to be encompassed by the following claims and their legal equivalents.

What is claimed is:

1. A method for managing a plurality of network communication resources for connecting to a plurality of service providers, comprising the steps of:
   maintaining, for each service provider, a first list of network communication resources identifying one or more signaling channels, each signaling channel controlling one or more bearing channels leading to the corresponding service provider;
   maintaining, for each signaling channel in the first list, a second list of bearing channels controlled by the signaling channel;
   determining, from a call set up request, a destination service provider;
   retrieving the first list associated with the destination service provider;
   selecting a signaling channel from the first list, wherein selecting a signaling channel is performed by identifying a signaling channel based on a value of a signaling channel pointer;
   incrementing the signaling channel pointer after the step of selecting;
   retrieving the second list of bearing channels for the selected signaling channel;
   selecting a bearing channel from the second list based upon status and availability; and
   establishing a call using the selected signaling channel and the selected bearing channel.

2. The method of claim 1, wherein the step of selecting a bearing channel is performed by identifying a bearing channel based on a value of a bearing channel pointer, and further comprising the step of incrementing the bearing channel pointer after the step of selecting.

3. The method of claim 1, further comprising the step of: checking a status of an initially-selected signaling channel, selecting the initially-selected signaling channel as the selected signaling channel if the initially-selected signaling channel has a positive status, and selecting a new signaling channel as the selected signaling channel if the initially-selected signaling channel has a negative status.

4. The method of claim 3, further comprising the step of returning a fail message if all signaling channels have a negative status.

5. The method of claim 1, further comprising the step of resetting the signaling channel pointer if the pointer exceeds the number of signaling channels.

6. The method of claim 2, further comprising the step of resetting the bearing channel pointer if the pointer exceeds the number of bearing channels.

7. The method of claim 1, wherein the step of selecting a bearing channel is performed by:
   checking a status of an initially-selected bearing channel, if the initially-selected bearing channel has a positive status, identifying the initially-selected bearing channel as the selected channel to set up a call,
   if the initially-selected bearing channel has a negative status, selecting another bearing channel as the initially-selected bearing channel, and
   if all of the bearing channels in the second list have a negative status, selecting a new signaling channel from the first list.

8. A communication system, comprising:
   a network configured to receive a call request from a requesting communication device and to establish a communication link between the requesting communication device and a destination communication device; and
   processing circuitry associated and operatively connected with the network, the processing circuitry configured to determine a communication path for the communication link, the communication path including signaling and bearing channels,
   wherein the processing circuitry maintains, for each destination communication device, a first list of network communication resources identifying one or more trunks, each trunk including one or more communication channels connectable to the corresponding destination device;

maintains, for each trunk in the first list, a second list of communication channels controlled by the trunk;

determines, from a call set up request, a call destination;

retrieves the first list associated with the call destination route;

selects a trunk from the first list by identifying a trunk based on a value of a first pointer, and modifies the pointer after the trunk is selected;

retrieves the second list of communication channels for the selected trunk;

selects a communication channel from the second list; and establishes a call using the selected trunk and the selected communication channel.

9. The system of claim 8, wherein the destination communication device is an Internet Service Provider.

10. The system of claim 8, wherein the processor modifies the pointer by incrementing the pointer value.

11. The system of claim 8, wherein the processor modifies the pointer by decrementing the pointer value.

12. The system of claim 8, wherein the processor modifies the pointer by adjusting the pointer value by a random amount.

13. The system of claim 8, wherein the processor selects a communication channel by identifying a channel based on a value of a second pointer, and further comprising the step of modifying the second pointer value after the selection.

14. The system of claim 13, wherein the processor modifies the second pointer by incrementing the pointer value.

15. The system of claim 13, wherein the processor modifies the second pointer by decrementing the pointer value.

16. The system of claim 13, wherein the processor modifies the second pointer by adjusting the second pointer value by a random amount.

17. The system of claim 8, wherein the processor checks a status of an initially-selected channel, selects the initially-selected channel as the selected channel if the initially-selected channel has a positive status, and selecting a new channel as the selected channel if the initially-selected channel has a negative status.

18. The system of claim 17, wherein the processor returns a fail message to the requesting communication device if all channels have a negative status.

19. The system of claim 8, wherein the processor resets the first pointer if the pointer exceeds the number of trunks.

20. The system of claim 10, wherein the processor resets the second pointer if the pointer exceeds the number of communication channels.

* * * * *